(12) United States Patent
Edamatsu et al.

(10) Patent No.: US 7,144,345 B2
(45) Date of Patent: Dec. 5, 2006

(54) TOOTHED BELT TRANSMISSION

(75) Inventors: Shigeki Edamatsu, Wako (JP); Hideo Urata, Wako (JP); Takao Nishida, Wako (JP); Hiroshi Kida, Yamato-Koriyama (JP)

(73) Assignees: Honda Giken Kogyo Kabushiki Kaisha (JP); Gates Unitta Asia Company (JP)

( * ) Notice: Subject to any disclaimer, the term of this patent is extended or adjusted under 35 U.S.C. 154(b) by 65 days.

(21) Appl. No.: 10/345,753

(22) Filed: Jan. 16, 2003

(65) Prior Publication Data

US 2003/0139241 A1   Jul. 24, 2003

(30) Foreign Application Priority Data

Jan. 21, 2002  (JP)  ............................ 2002-011988
Apr. 25, 2002  (JP)  ............................ 2002-124951

(51) Int. Cl.
*F16G 1/28* (2006.01)
(52) U.S. Cl. ..................................... 474/205
(58) Field of Classification Search ............... 474/148, 474/152, 153, 205
See application file for complete search history.

(56) References Cited

U.S. PATENT DOCUMENTS 4,041,789 A * 8/1977 Hoback .................... 474/148
6,648,784 B1 * 11/2003 Redmond ................. 474/153

FOREIGN PATENT DOCUMENTS

JP  11132291   5/1999
JP  2995021   10/1999

* cited by examiner

*Primary Examiner*—Vicky A. Johnson
(74) *Attorney, Agent, or Firm*—Adams & Wilks

(57) ABSTRACT

A toothed belt transmission is provided in which a toothed belt is trained around drive and driven pulleys. Each toothed pulley has a circumferential periphery formed with a plurality of teeth. Adjacent teeth are assigned as a first tooth portion and a second tooth portion. Respective tooth portions have arcuate portions at corners defined between tooth edges and tooth surfaces. A line touching the arcuate portions of the first and second tooth portions is assigned as a common tangential line. A line passing over a starting point of the arcuate portion of the tooth edge of the first tooth is assigned as a first tangential line. An angle between the common tangential line and the first tangential line falls in a range between 6° and 14.4°.

2 Claims, 5 Drawing Sheets

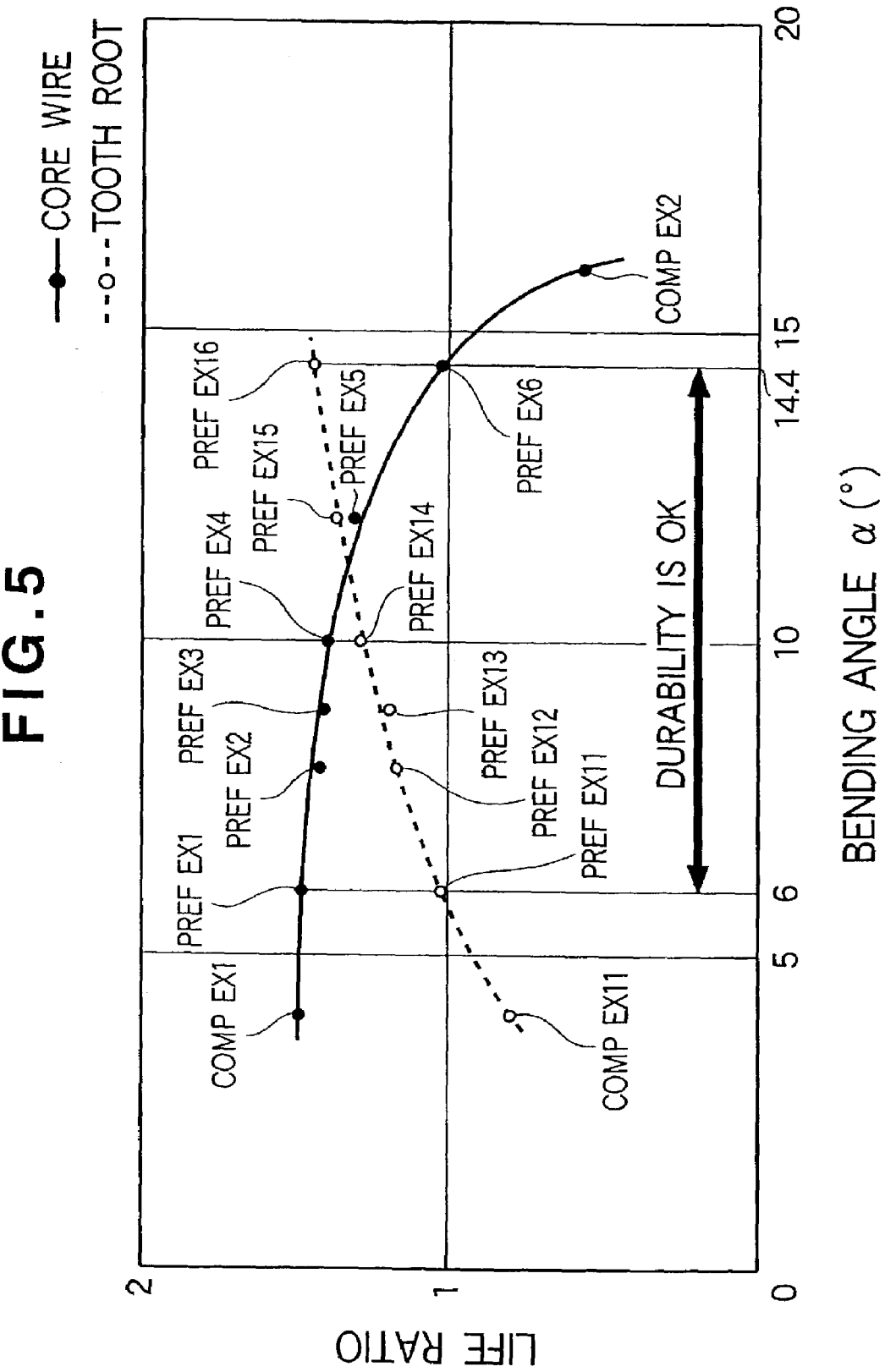

TOOTHED BELT TRANSMISSION

FIELD OF THE INVENTION

The present invention relates to an improvement in a toothed belt transmission having a toothed belt trained around toothed drive and driven pulleys.

BACKGROUND OF THE INVENTION

Toothed belt transmissions each having a toothed belt and two toothed pulleys for transmitting power are known from Japanese Patent Laid-Open Publication No. HEI-11-132291 entitled "TOOTHED BELT TRANSMISSION DEVICE" and Japanese Patent No. 2995021 entitled "SYNCHRONOUS PULLEYS AND POWER TRANSMISSION USING THE SAME".

In the toothed belt transmission of HEI-11-132291, a toothed belt has tooth edges and tooth bottoms formed by respective arcs and tooth edges and tooth bottoms of sprockets are formed by respective arcs. With this arrangement, the tooth bottoms of the toothed belt and the tooth edges of the sprockets are brought into tight engagement with each other such that relative slippage between the tooth bottoms and the tooth edges is limited to preclude deterioration in a wear-resistant property.

In the transmission of Japanese Patent No. 2995021, a toothed pulley includes tooth grooves each defined by a pair of concave or arcuate pressure-bearing surfaces provided on opposite sides of a center line of a tooth groove. Curvature centers of the arcs forming the pressure-bearing surfaces are positioned on a straight line intersecting the groove center line. A distance (on the groove center line) between the straight line and a groove bottom surface is set to cause the curvature center to be positioned outside a pulley pitch line so that a peripheral dimension of each tooth groove becomes smaller than that of a conventional tooth groove in which the curvature center lies on the pulley pitch line, resulting in a greater peripheral length of a pulley land portion than that of the conventional pulley land portion. As a result, an increase in a surface pressure between the pulley land and a belt land of the toothed belt is inhibited to thereby preclude wear of the belt caused by the increased surface pressure, thus improving durability of the toothed belt.

Both transmissions of Japanese Patent Laid-Open Publication No. HEI-11-132291 and Japanese Patent No. 2995021 are directed to technologies in which by improving the tooth portion or the shape of the tooth grooves of the toothed belt and the toothed pulley (or sproket), durability of the toothed belt transmission is improved. For example, when applying the toothed belt transmission to an engine of small outer dimension, the toothed belt is trained around the toothed pulley (or sprocket) of small diameter and the belt per se, especially, its tooth root, is caused to locally bend at a large extent. Further, with the toothed belt in which an endless core wire is buried along a peripheral length of the toothed belt in order to prevent extension, the core wire is caused to locally bend at the large extent. This results in degradation in durability of the tooth portion or the core wire of the toothed belt.

To this end, it is desired to provide a toothed belt transmission having a toothed pulley with a small diameter in mesh with a toothed belt while the toothed belt has an improved durability.

SUMMARY OF THE INVENTION

According to the present invention, there is provided a toothed belt transmission comprising a toothed drive pulley, a toothed driven pulley, and a toothed belt trained around the two toothed pulleys and having a plurality of core wires embedded therein, wherein adjacent tooth portions of each toothed pulley are assigned as a first tooth portion and a second tooth portion and arcuate portions are formed at corners between respective tooth edges and respective tooth surfaces of the first and second tooth portions, whereby when a common tangential line is drawn to come into contact with both the arcuate portions of the first and second tooth portions and a first tangential line passing over a starting point of the tooth edge of the first tooth portion, an angle between the common tangential line and the first tangential line is selected to have a value ranging from 6 to 14.4°.

By setting the angle between the common tangential line and the first tangential line at a value ranging from 6 to 14.4°, it is possible to provide prolonged durability of the core wires and the tooth roots of the toothed belt to thereby increase durability of the toothed belt itself. This further makes it possible to decrease an outer diameter of the toothed pulleys to thereby provide a down-sized engine.

When the angle becomes smaller than 6°, durability of the tooth roots decreases due to the influence of the tooth portions of the toothed pulleys. When the angle becomes larger than 14.4°, the bending stress of the core wires becomes large, thereby deteriorating durability of the core wires.

BRIEF DESCRIPTION OF THE DRAWINGS

A preferred embodiment of the present invention will be described in detail below, byway of example only, with reference to the accompanying drawings, in which:

FIG. 5 is a graph illustrating the results of a fatigue-wear test conducted on the toothed belt according to the present invention.

DETAILED DESCRIPTION OF THE PREFERRED EMBODIMENT

Figure 1:
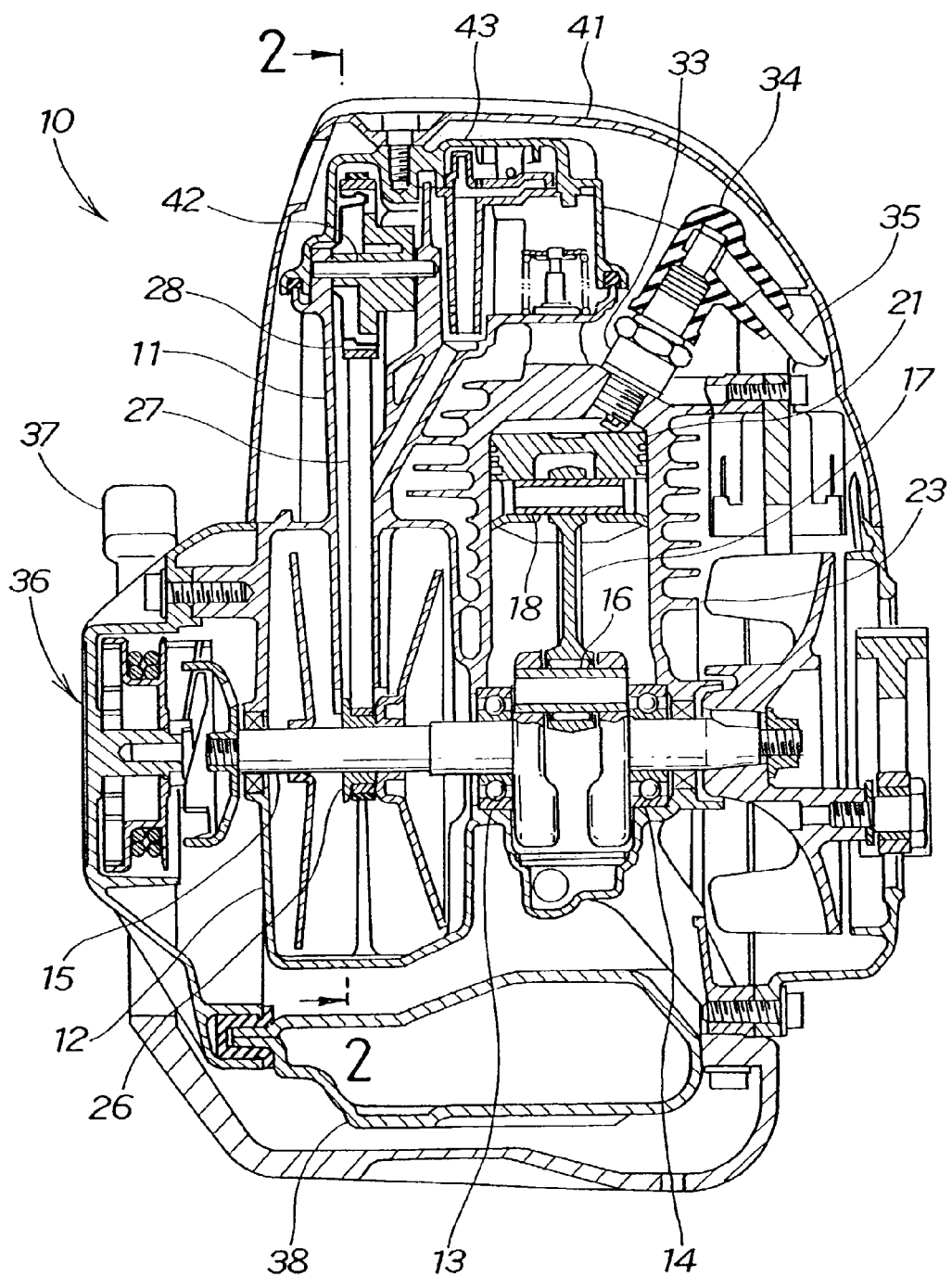
FIG. 1 is a cross-sectional view illustrating an engine employing a toothed belt transmission according to the present invention.

Referring to FIG. 1, an engine 10 includes a small-size four-cycle OHC engine wherein a crankshaft 15 is rotatably mounted at a perimeter between an upper case 11 and a lower case 12 by means of bearings 13, 14, a connecting rod or con' rod 17 is swingably mounted to the crankshaft 15 by means of a piston pin 16, and a piston 21 is swingably mounted to the upper case 11 by means of a piston pin 18. The piston 21 is movably mounted to a cylinder portion 23 provided in the upper case 11.

A camshaft (not shown), formed with cams for opening and closing an intake valve and an exhaust valve, is mounted at an upper area of the upper case 11. A toothed belt 27, also called a timing belt, is trained around a toothed drive pulley 26, mounted to the crankshaft 15, and a toothed driven pulley 28 connected to the camshaft.

Reference numerals 33, 34, 35, 36, 37, 38, 41, 42 and 43 respectively designate an ignition plug, a plug cap, a high tension cord, a recoil starter, a nob for the recoil starter, a fuel tank, an upper cover, a pivot shaft serving as a rotatable shaft of the toothed driven pulley 28, and a head cover.

Figure 2:
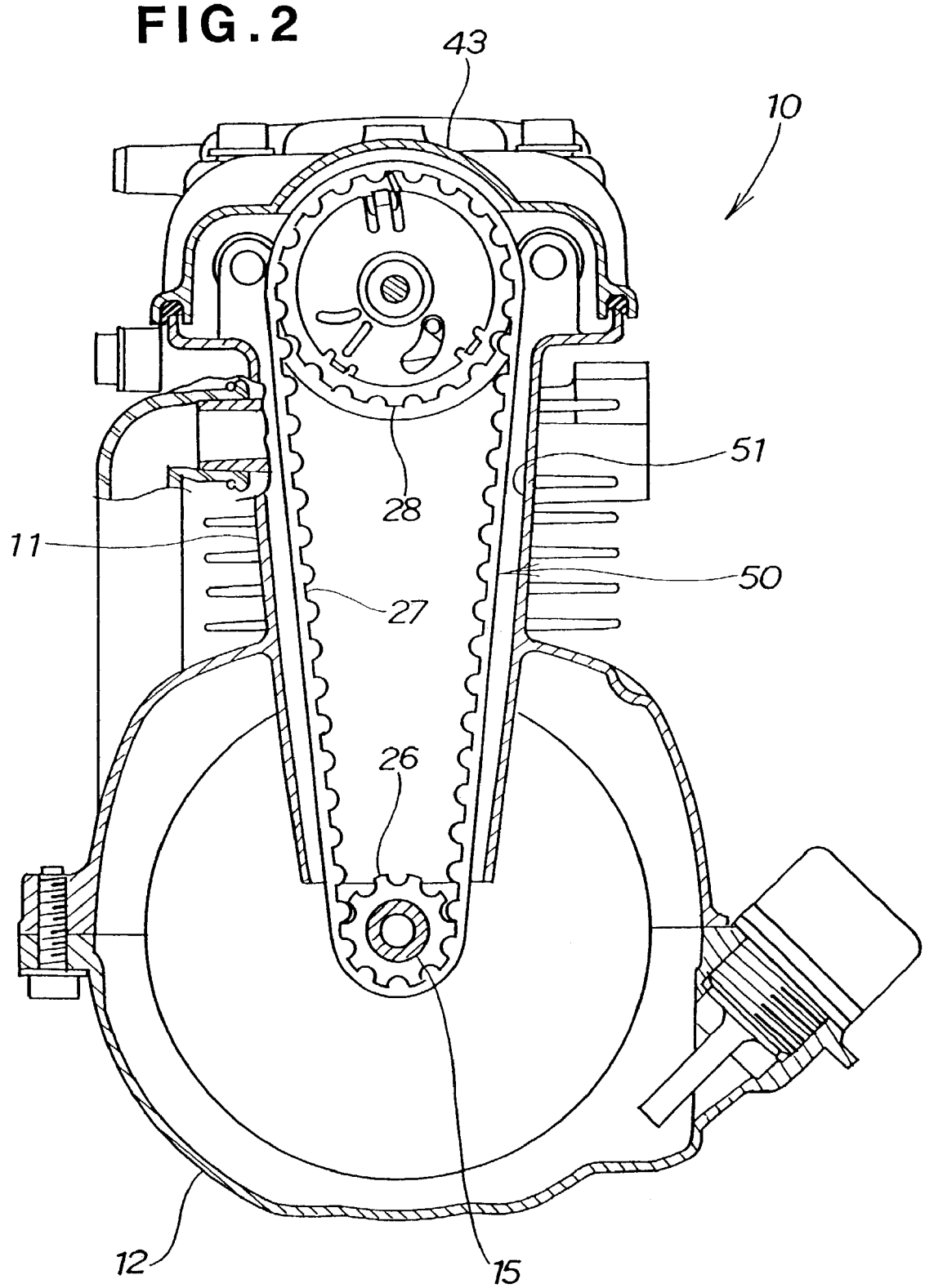
FIG. 2 is a cross-sectional view taken along line 2—2 of FIG. 1.

Reference is made next to FIG. 2 showing the toothed belt 27 trained around the toothed drive pulley 26 of reduced diameter and the toothed driven pulley 28.

The toothed drive pulley 26, the toothed belt 27 and the toothed driven pulley 28 jointly form a toothed belt transmission 50.

Since the toothed drive pulley 26 and the toothed driven pulley 28 have a given number of teeth provided at a given ratio, selecting the toothed drive pulley 26 to have a small diameter enables the toothed driven pulley 28 to have a small diameter. Thus, the presence of the toothed drive pulley 26 and the toothed driven pulley 28 respectively selected to have such small diameters enables a housing for accommodating the toothed belt transmission 50 to be decreased in size, enabling the engine 10 to be provided in smaller size.

Figure 3:
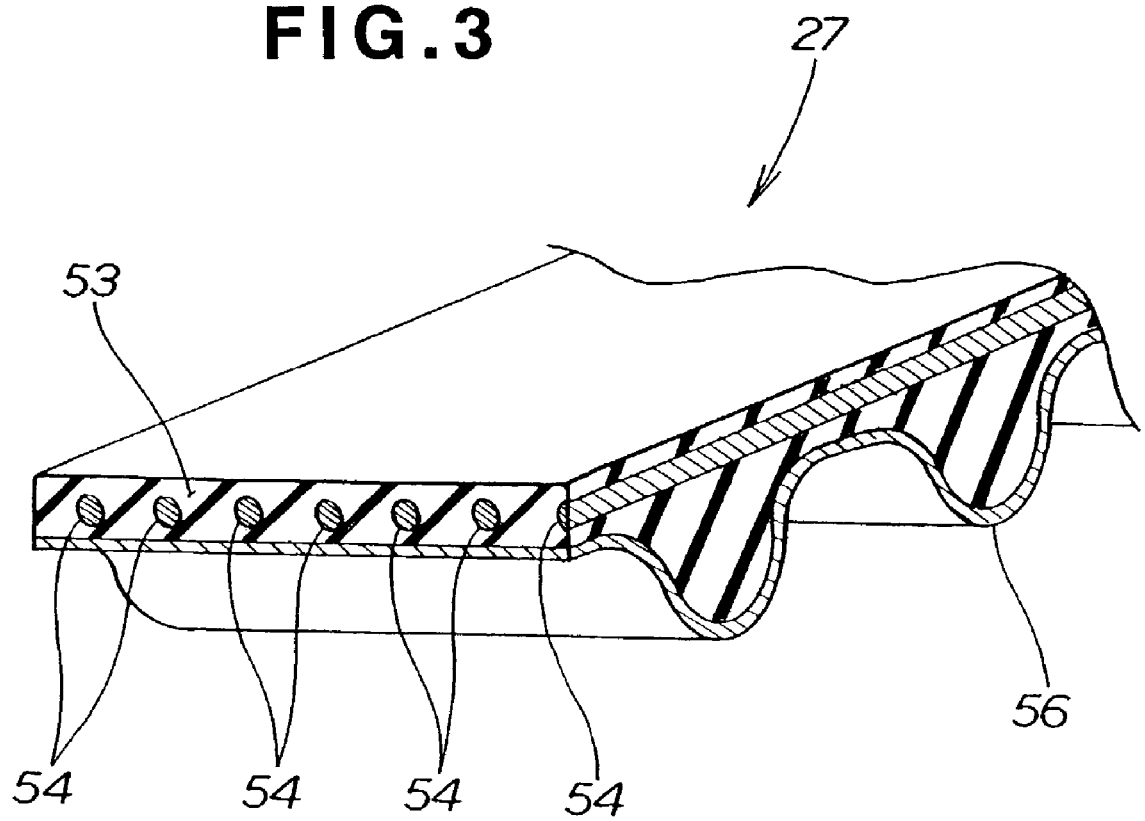
FIG. 3 is a perspective view illustrating, partly in section, the toothed belt of FIG. 1.

As shown in FIG. 3, the toothed belt 27 is comprised of a belt body 53 made of rubber with a flat belt portion unitarily formed with teeth, a plurality of core wires 54 made of fiberglass embedded in the belt body 53 to provide resistance to extension, and a tooth covering cloth 56.

Figure 4:
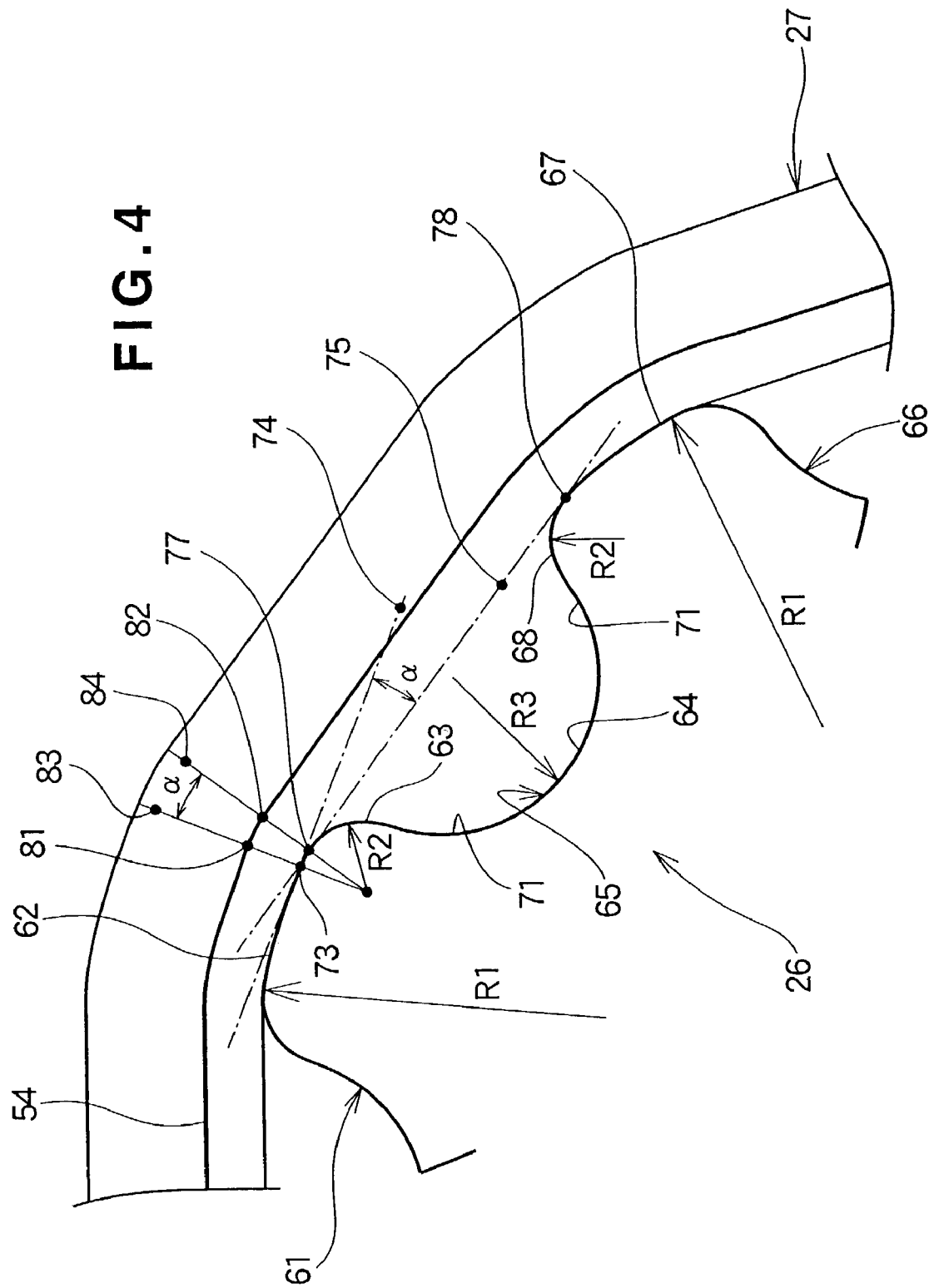
FIG. 4 is a schematic view illustrating a bending angle of the toothed belt of the toothed belt transmission shown in FIG. 3.

Referring to FIG. 4, discussion will be made next as to a bending angle of the toothed belt. Durability of the toothed belt is principally determined by durability of the core wires and the teeth, while durability of the core wires and the teeth remarkably depends on the degree of bending property of the toothed belt. In the embodiment being described, the degree of bending property of the toothed belt is defined as the bending angle obtained from the shape of the toothed pulley. The bending angle is explained below.

In FIG. 4, suppose that a radius of a tooth edge 62 of a first tooth portion 61 of the toothed drive pulley 26 is R1, a radius of an arcuate portion 63 contiguous with the tooth edge 62 and a tooth surface 71, described below, is R2, a radius of an arcuate portion 64 located at a tooth bottom and contiguous with the arcuate portion 63 is R3, and a radius of an arcuate portion 68 continuing with a tooth edge 67 and the arcuate portion 65 of a second tooth portion 66 (although the second tooth portion 66 takes the same shape as the first tooth portion 61, these tooth portions are distinguished from one another for clarity) contiguous with the first tooth portion is R2. The tooth surfaces 71, 71 lie adjacent to the arcuate portion 63 and the arcuate portion 68 while forming a part of the arcuate portion 65. Stated otherwise, the tooth 61 has a tooth edge 62 of radius R1 that merges at opposite ends with first (not numbered) and second 63 arcuate portions of radius R2 and the tooth 66 has a tooth edge 67 of radius R1 that merges at opposite ends with first 68 and second (not numbered) arcuate portions of radius R2.

It is also supposed that a contact point between the tooth edge 62 and the arcuate portion 63 is a bending point 73 (that is, the point of intersection of radius R1 of the tooth edge 62 and radius R2 of the arcuate portion 63), an imaginary tangential line passing over the bending point 73 is a tooth edge tangential line 74 serving as a first tangential line, an imaginary tangential line touching both the second arcuate portion 63 of the first tooth portion 61 and the first arcuate portion 68 of the second tooth 66 is a common tangential line 75, a contact point lying on the arcuate portion 63 of the common tangential line 75 is a first contact point 77, and a contact point lying on the arcuate portion 68 of the common tangential line 75 is a second contact point 78. An angle between the tooth edge tangential line 74 and the common tangential line 75 is called a bending angle α.

The toothed belt 27 is trained or wound around the tooth edge 62 and the arcuate portion 63 of the toothed drive pulley 26 so that the core wires 54 bend at a bending angle of α in a range between a point 81 and a point 82. The point 81 is an intersecting point where a normal line 83 of the tooth edge tangential line 74, passing over the bending point 73, and the core wire 56 meet. The point 82 is an intersecting point where a normal line 84 of the tooth edge tangential line 75, passing over the first contact point 77, and the core wire 56 meet.

Factors related to the bending angle include an outer diameter of the toothed drive pulley 26 (that is, a tooth edge diameter) and the number of teeth. For instance, supposing that external shapes of the tooth portions 61, 66 are constant, increasing an external diameter of the toothed drive pulley 26 causes the number of teeth to increase to allow the toothed belt 27 to wind in a further polygonal shape such that the larger the polygonal points, the smaller will be the external angle, and similarly the smaller will be the bending angle α. Further, decreasing the outer diameter of the toothed drive pulley 26 causes the number of teeth to decrease with a resultant increase in the bending angle α.

That is, in FIG. 4, increasing the bending angle α causes the core wire 54 to bend at a large angle, resulting in an increased stress applied to the core wires 54 with a resultant decrease in durability. Decreasing the bending angle α causes the core wires 54 to bend in a small degree and the stress on the core wires 54 becomes small, thereby increasing the durability.

However, if the bending angle α is small, in FIG. 4, the maximum stress concentrates on an inner surface of the toothed belt 27 at a point between the bending point and the first contact point 77 lying on the arcuate portion 63 of the common tangential line 75 when the toothed belt 27 winds around the tooth edge 62 and the arcuate portion 63 of the toothed drive pulley 26. Namely, since a distance between the bending point 73 and the first contact point 77 decreases as the bending angle α decreases, wear of the tooth covering cloth of the toothed belt 27 is apt to increase such that the tooth root of the toothed belt 27 has a decreased strength with a resultant decrease in durability.

In view of the foregoing observations, fatigue and wear tests have been conducted on the toothed belt 27 in terms of the bending angle α in order to obtain an upper limit of the bending angle α for precluding the bending stress of the core wire 54 from increasing even when the outer diameter of the toothed drive pulley 26 is decreased, and to obtain a lower limit in the bending angle α for ensuring the fatigue and wear strength at the tooth root.

Resultant values of the fatigue and wear tests are represented in Table 1 below, and the results of the fatigue and wear strength of the core wire are described below with reference to Table 1.

TABLE 1

| Test Pieces | Bending Angles A (°) | Life Ratio of Core Wire | Judgments |
|---|---|---|---|
| Comparative Example 1 | 4.0 | 1.48 | Favorable |
| Preferred Example 1 | 6.0 | 1.49 | Favorable |

TABLE 1-continued

| Test Pieces | Bending Angles A (°) | Life Ratio of Core Wire | Judgments |
|---|---|---|---|
| Preferred Example 2 | 8.0 | 1.42 | Favorable |
| Preferred Example 3 | 8.9 | 1.41 | Favorable |
| Preferred Example 4 | 10.0 | 1.39 | Favorable |
| Preferred Example 5 | 12.0 | 1.30 | Favorable |
| Preferred Example 6 | 14.4 | 1.02 | Favorable |
| Comparative Example 2 | 16.0 | 0.56 | Unfavorable |

Table 1 shows evaluations of the fatigue and wear strength of the core wire, when the bending angle α of the toothed belt is varied in conjunction with test pieces used in Preferred Examples 1 to 6 and Comparative Examples 1 and 2.

When conducting the fatigue and wear tests, the toothed belt is trained around the toothed drive pulley and the toothed driven pulley to allow the toothed drive pulley to rotate at a given rotational speed to cause the toothed belt, more specifically, the core wire and the tooth root to be applied with a stress-amplitude due to repetitive bending, and calculation is made to find a rate of time (real life time), in which the core wire and the tooth root are damaged (involving cracks), with respect to a reference life time for defining the life ratio, with durability of the toothed belt being judged with the life ratio of the core wire and the life ratio of the tooth root (which is expressed as life ratio of the core wire=time interval (in which the core wire is damaged) ÷reference life time, and life ratio of the tooth root=time interval (in which the tooth root is damaged)÷reference life time). Table 1 illustrates the life ratio of the core wire, and the life ratio of the tooth root is described below with reference to Table 2 which will be described later.

The core wire of the toothed belt used in the tests has the following specifications.

Core Wire Specification
  Material: fiberglass
  Wire diameter: 0.5 mm

Now, test results of respective test pieces are described below.

COMPARATIVE EXAMPLE 1

Bending angle α=4.0°
The life ratio of the core wire of the toothed belt is 1.48, which is greater than 1.00, and a favorable judgment is obtained.

PREFERRED EXAMPLE 1

Bending angle α=6.0°
The life ratio of the core wire of the toothed belt is 1.49, which is greater than 1.00, and a favorable judgment is obtained.

PREFERRED EXAMPLE 2

Bending angle α=8.0°
The life ratio of the core wire of the toothed belt is 1.42, which is greater than 1.00, and a favorable judgment is obtained.

PREFERRED EXAMPLE 3

Bending angle α=8.9°
The life ratio of the core wire of the toothed belt is 1.41, which is greater than 1.00, and a favorable judgment is obtained.

PREFERRED EXAMPLE 4

Bending angle α=10.0°
The life ratio of the core wire of the toothed belt is 1.39, which is greater than 1.00, and a favorable judgment was obtained.

PREFERRED EXAMPLE 5

Bending angle α=12.0°
The life ratio of the core wire of the toothed belt is 1.30, which is greater than 1.00, and a favorable judgment is obtained.

PREFERRED EXAMPLE 6

Bending angle α=14.4°
The life ratio of the core wire of the toothed belt is 1.02, which is greater than 1.00, and a favorable judgment is obtained.

COMPARATIVE EXAMPLE 2

Bending angle α=16.0°
The life ratio of the core wire of the toothed belt is 0.56, which is less than 1.00, and an unfavorable judgment is obtained.

Next, test results of the fatigue and wear strength of the tooth root are described below with reference to Table 2 below.

TABLE 2

| Test Pieces | Bending Angles α (°) | Life Ratio of Tooth Root | Judgments |
|---|---|---|---|
| Comparative Example 11 | 4.0 | 0.8 | Unfavorable |
| Preferred Example 11 | 6.0 | 1.01 | Favorable |
| Preferred Example 12 | 8.0 | 1.17 | Favorable |
| Preferred Example 13 | 8.9 | 1.18 | Favorable |
| Preferred Example 14 | 10.0 | 1.28 | Favorable |
| Preferred Example 15 | 12.0 | 1.35 | Favorable |
| Preferred Example 16 | 14.4 | 1.43 | Favorable |

Table 2 shows evaluations on the fatigue and wear strength of the tooth root, with the bending angle α of the toothed belt varied, in conjunction with test pieces used in Preferred Examples 11 to 16 and Comparative Example 11. Specifications for testing the tooth root of the toothed belt are selected such that the fatigue and wear strength of the core wire with respect to Preferred Examples 1 to 6 and Comparative Examples 1 and 2 is increased so as to preclude possible interruption in the tests due to damage of the core wire. (Also, the toothed belt is selected to have the same specifications as those of Table 1 except for the core wire).

The core wire of the toothed belt used for testing has the following specifications.

Core Wire Specification
Material: fiberglass
Wire diameter: 0.4 mm
Number of Wires: 11 pieces Now, test results of respective test pieces are described below.

COMPARATIVE EXAMPLE 11

Bending angle α=4.0°
The life ratio of the tooth root of the toothed belt is 0.8, which is less than 1.00, and an unfavorable judgment is obtained.

PREFERRED EXAMPLE 11

Bending angle α=6.0°
The life ratio of the tooth root of the toothed belt is 1.01, which is greater than 1.00, and a favorable judgment is obtained.

PREFERRED EXAMPLE 12

Bending angle α=8.0°
The life ratio of the tooth root of the toothed belt is 1.17, which is greater than 1.00, and a favorable judgment is obtained.

PREFERRED EXAMPLE 13

Bending angle α=8.9°
The life ratio of the tooth root of the toothed belt is 1.18, which is greater than 1.00, and a favorable judgment is obtained.

PREFERRED EXAMPLE 14

Bending angle α=10.0°
The life ratio of the tooth root of the toothed belt is 1.28, which is greater than 1.00, and a favorable judgment is obtained.

PREFERRED EXAMPLE 15

Bending angle α=12.0°
The life ratio of the tooth root of the toothed belt is 1.35, which is greater than 1.00, and a favorable judgment is obtained.

PREFERRED EXAMPLE 16

Bending angle α=14.4°
The life ratio of the tooth root of the toothed belt is 1.43, which is greater than 1.00, and a favorable judgment is obtained.

Reference is now made to FIG. 5 in which the above test results on the toothed belt are shown in a graphic form. In this graph, the ordinate represents the life ratio while the abscissa represents the bending angle α(°). A solid line and black points or dots indicate the life ratio of the core wire; a broken line and white points or dots indicate the life ratio of the tooth root.

As shown in the graph, the life ratio of the core wire decreases as the bending angle α increases. As the bending angle α exceeds a value of 14.4, then the life ratio becomes less than 1.

The life ratio of the tooth root increases as the bending angle α increases. As the bending angle α exceeds a value of 6.0, then the life ratio becomes greater than 1.

As can be appreciated from the above, the durability of the toothed belt becomes favorable when $6.0 \leq \alpha \leq 14.4$. That is, a toothed belt with a shape satisfying the above bending angle α is obtained.

The toothed pulley of α=14.40, for instance, has a tooth edge circle diameter of 19.3 mm with the number of teeth of 10, and choosing the toothed belt with the small diameter allows a total length of the toothed belt to be shortened due to a decrease in the diameter, with the result that an engine is minimized owing to the toothed pulley of reduced diameter and the toothed belt of shortened length.

As set forth above in conjunction with FIGS. 2, 4 and 5, the present invention is directed to the toothed belt transmission 50 wherein the toothed belt 27 having the core wires 54 embedded therein is trained around the toothed drive pulley 26 and the toothed driven pulley 28 for transmitting drive power, which toothed belt transmission is characterized in that the adjacent tooth portions of the respective toothed pulleys 26, 28 are assigned as the first tooth portion 61 and the second tooth portion 66 which are formed with the arcuate portions 63, 68 at corners between the respective tooth edges 62, 67 and the tooth surface 71, whereby when the common tangential line 75 is drawn to pass over the arcuate portion 63 of the first tooth portion 61 and the arcuate portion 68 of the second tooth portion 66 while drawing the tooth edge tangential line 74 at the starting point of the tooth edge 62 forming the arcuate portion 63 of the first tooth portion 61, i.e., the bending point 73, the bending angle α between the common tangential line 75 and the tooth edge tangential line 74 is selected to have a value ranging from 6 to 14.4°.

Selecting the bending angle α between the common tangential line 75 and the tooth edge tangential line 74 to be in a value ranging from 6 to 14.4° enables the core wires 54 and the tooth root 93 of the toothed belt 27 to have increased durability to improve the durability of the toothed belt 27, while enabling the outer diameter of the toothed drive pulley 26 to be decreased for thereby minimizing the engine 10.

In a case where the above angle is below 6°, the tooth root 93 of the toothed belt 27 is adversely affected with the first tooth portion 61 and the second tooth portion 66 of the toothed drive pulley 26, resulting in a decrease in durability of the tooth root 93. In a case where the above angle becomes greater than 14.4°, the bending stress of the core wires 54 increases, resulting in deterioration in durability of the core wires 54.

The present disclosure relates to the subject matters of Japanese Patent Application No. 2002-011988, filed Jan. 21, 2002, and Japanese Patent Application No. 2002-124951, filed Apr. 25, 2002, the disclosures of which are expressly incorporated herein by reference in their entireties.

What is claimed is:

1. A toothed belt transmission comprising:
a toothed drive pulley;
a toothed driven pulley; and
a toothed belt trained around the two toothed pulleys and having a plurality of core wires embedded therein,
wherein adjacent tooth portions of each toothed pulley are assigned as a first tooth portion and a second tooth portion forming a recess in which a tooth of the toothed belt is received, the first and second tooth portions each having a tooth outer edge having a first radius and a tooth recess surface, wherein tooth arcuate portions having a second radius are formed at corners between respective tooth outer edges and respective tooth recess surfaces of the first and second tooth portions, and wherein the tooth outer edges of the first and second tooth portions having the first radius merge at opposite ends thereof with respective tooth arcuate portions having the second radius at contact points where the first and second radii intersect, whereby when a common tangential line is drawn to come into contact with one tooth arcuate portion of the first tooth portion and an adjacent tooth arcuate portion of the second tooth portion and a first tangential line is drawn to pass through a contact point between the tooth outer edge and the one tooth arcuate portion of the first tooth portion where the first and second radii intersect, an angle between the common tangential line and the first tangential line is selected to have a value ranging from 6 to 14.40.

2. A toothed belt transmission according to claim 1; wherein the angle corresponds to a bending angle of the toothed belt, the bending angle being the angle of bending of the toothed belt as it travels around one tooth portion of the drive or driven pulley.

* * * * *